United States Patent [19]
Brewen et al.

[11] Patent Number: 5,524,105
[45] Date of Patent: Jun. 4, 1996

[54] HELICAL OPTICAL TAPE READ/WRITE SYSTEM USING AT LEAST ONE LASER ARRAY

[75] Inventors: Alan T. Brewen, Pittsford; Stephen C. Arnold, Honeoye; Daniel J. Sillick, Rochester, all of N.Y.

[73] Assignee: Eastman Kodak Company, Rochester, N.Y.

[21] Appl. No.: 249,648

[22] Filed: May 26, 1994

Related U.S. Application Data

[63] Continuation of Ser. No. 998,186, Dec. 29, 1992, abandoned.

[51] Int. Cl.⁶ .................................................. G11B 7/095
[52] U.S. Cl. ................. 369/97; 369/44.170; 369/44.180
[58] Field of Search ................................ 369/97, 44.17, 369/113, 44.18, 112, 44.19, 44.14

[56] References Cited

U.S. PATENT DOCUMENTS

| | | | |
|---|---|---|---|
| 3,314,075 | 4/1967 | Becker | 346/108 |
| 4,198,701 | 4/1980 | Reddersen et al. | 369/44.38 X |
| 4,411,503 | 10/1983 | Bailey et al. | 352/222 |
| 4,525,828 | 6/1985 | Higashiyama et al. | 369/111 |
| 4,567,585 | 1/1986 | Gelbart | 369/97 |
| 4,577,932 | 3/1986 | Gelbart | 359/305 |
| 4,633,455 | 12/1986 | Hudson | 369/97 X |
| 4,661,941 | 1/1987 | Bell et al. | 369/111 |
| 4,669,070 | 3/1987 | Bell | 369/44 |
| 4,743,091 | 5/1988 | Gelbart | 369/112 |
| 4,807,213 | 2/1989 | Chung et al. | 369/44.18 |
| 4,815,067 | 3/1989 | Webster et al. | 369/97 |
| 4,939,715 | 7/1990 | Vogeigesang et al. | 360/93 |
| 4,970,707 | 11/1990 | Hara et al. | 369/44.11 |
| 5,081,617 | 1/1992 | Gelbart | 369/112 |
| 5,097,457 | 3/1992 | Keens et al. | 369/44.17 |
| 5,107,372 | 4/1992 | Gelbart et al. | 359/824 |
| 5,120,136 | 6/1992 | Oakley | 369/97 |
| 5,155,720 | 10/1992 | Narahara et al. | 369/97 |
| 5,239,528 | 8/1993 | Narahara et al. | 369/44.18 |
| 5,272,689 | 12/1993 | Tsujioka et al. | 369/97 X |
| 5,287,341 | 2/1994 | Ozue et al. | 369/97 |

FOREIGN PATENT DOCUMENTS 3-144918  6/1991  Japan .

OTHER PUBLICATIONS

Narahara et al, A New Method for Helical Scanning Optical Tape Recorder, Nov. 1993, Jpn. J. Appl. Phys. vol. 32 Nov. 1993 pp. 5421–5427.

*Primary Examiner*—Aristotelis Psitos
*Assistant Examiner*—Thang V. Tran
*Attorney, Agent, or Firm*—Raymond L. Owens

[57] ABSTRACT

An optical tape is helically passed over a cylindrical outer surface of a drum at a first speed to effect a substantial circumferential wrap thereof. A first write/read head with a writing laser array generates light beams that are directed along a first path through an optical rotator, and then via an optical arrangement on the drum onto a portion of the optical tape at a wrapping location of the drum to effect helical scanning of that portion of the optical tape. The optical rotator and the optical arrangement are rotated parallel to the first path at second and third rotational speeds, respectively, where the third speed is twice the second speed. This results in a dynamic imaging of the light beams from the first write/read head in closely spaced and parallel tracks to write binary data on the portion of the optical tape at the wrapping location using a passive focusing control. A linear array of binary data stored on tracks on the optical tape is read by the first write/read head transmitting an illumination beam via the optical rotator and the optical arrangement to illuminate a portion of the tape, and then detecting the linear array of binary data returned via a reflected light beam using a detector array. Multiple write/read heads with associated optical arrangements can use the same rotating optical rotator to concurrently write and read data at separate sections of the optical tape.

41 Claims, 6 Drawing Sheets

FIG. 9

HELICAL OPTICAL TAPE READ/WRITE SYSTEM USING AT LEAST ONE LASER ARRAY

This is a Continuation of application Ser. No. 998,186, filed 29 Dec. 1992, now abandoned.

FIELD OF THE INVENTION

The present invention relates to tape write/read storage systems and, more particularly, to optical tape data storage systems that feed an optical tape helically around a drum while writing and/or reading digital data on the optical tape.

BACKGROUND OF THE INVENTION

An increasing number of users of stored information are facing requirements of expanded storage capacity, faster retrieval, and lower cost than found in prior art data storage systems. Therefore, there has been a move to denser and denser magnetic disks and tapes, and, more recently, to optical disks and optical tapes.

The article entitled "Terabyte Optical Tape Recorder" by K. Spencer, in *Ninth IEEE Symposium On Mass Storage Systems*, Oct. 31–Nov. 3, 1988, Monterey, Calif., at pages 144–146, discloses a CREO Products, Inc. optical tape recorder. The CREO recorder uses a tape transport comprising three direct drive motors, and a linear scanner including laser diodes with associated optics, a slide with a mirror mounted thereon, an air bearing wherein the slide moves longitudinally, and an optical encoder. To write bits across the optical tape, the slide moves longitudinally within the air bearing to move the mirror transversely to the width of the optical tape while the light encoded data is reflected from the mirror and onto the optical tape. In operation, the recorder scans across the optical tape in a first direction to record bits of information across the tape. The tape then steps in a predetermined direction, and the linear scanner crosses the optical tape in a second opposite direction to write a next record. The CREO recorder writes 32 data bits at a time, and as the linear scanner goes across the tape it writes four bytes of information by 20,000 bytes thus giving an 80 kilobyte physical record. The CREO optical tape recorder has a sustained data rate of three megabytes per second using a 1.5 micron spot spacing on the optical tape, and a head-to-tape speed of 36 meters per second.

U.S. Pat. No. 4,815,067 (E. Webster et al.), issued on Mar. 21, 1989, discloses a helically scanned optical rotary headwheel tape and replay system. The system comprises a rotating drum with a galvanometer mirror for controlling the tracking of a number of write and read light beams during recording and replay. Dynamic focussing of the light beams on the recording medium is controlled by means of a voice-coil actuator operating on a lens situated outside the drum. An optical rotator is provided through which combined write and read light beams pass. The optical rotator is driven by a motor to rotate at half the rotational velocity of the drum. This presents an image to the optical tape which rotates synchronously with the drum.

It is desirable to provide an optical tape data storage system which performs at high data rates (e.g., at least 100 megabytes per second) and is adaptable to different tape widths and extended data rates.

SUMMARY OF THE INVENTION

The present invention is directed to an optical tape data storage system and method which writes and/or reads data on an optical tape at high data rates. More particularly, the present invention relates to a system for the optical recording and/or playback of data. In a first aspect of the present invention, the system comprises means for helically passing an optical tape over a cylindrical outer surface of a drum, first head means, and first optical means. The means for helically passing the optical tape, which is suitable for storage of binary data in the form of indicia of differing optical characteristics of the optical tape from indicia of corresponding differing optical characteristics in a light beam, over a cylindrical outer surface of a drum passes the optical tape over the drum at a first speed to effect a substantial circumferential wrap thereof at a wrapping location. The first head means comprises an array of M lasers which generates a light beam that propagates onto a predetermined portion of the optical tape at the wrapping location of the drum to effect helical scanning of that predetermined portion of the optical tape. The first optical means effects dynamic imaging of the light beam from the first head means onto the predetermined portion of the optical tape at the wrapping location. The first optical means comprises an optical rotator, and light directing means. The optical rotator receives the light beam from the first head means along a first path parallel to an optical axis of the optical rotator. The optical rotator is rotated at a second speed around its optical axis. The light directing means rotates around an axis parallel to the first path at a third speed which is twice the second speed for redirecting the light beam propagating along the first path from the optical rotator to a second path substantially normal to the first path and onto the predetermined portion of the optical tape at the wrapping location.

In a second aspect of the present invention, the system comprises a drum, an optical rotator, a cylindrical headwheel, first light directing means, and a first write/read head. The drum comprises a cylindrical outer surface defining a first opening disposed normal to a longitudinal axis of the drum over which the optical tape is helically moved at a first predetermined speed. Still further, the drum defines a second opening parallel to a longitudinal axis of the drum which intersects the first opening. The optical rotator is rotated at a second speed in the second opening of the drum around an axis parallel to the longitudinal axis of the drum. The cylindrical headwheel is disposed in the first opening of the drum for rotation around the longitudinal axis of the drum at a third speed which is twice that of the second speed of the optical rotator. The first light directing means is mounted on an end of the cylindrical headwheel for converting a substantially collimated light beam representative of indicia of differing optical characteristics of an array of binary data at an output surface of the optical rotator into an image of the indicia of differing optical characteristics of the array of binary data on a predetermined section of the optical tape. The first write/read head comprises a data writing section comprising an array of M lasers for generating the collimated light beam including the indicia of differing optical characteristics of the array of binary data which is directed by the first write/read head along a first path through the rotating optical rotator and onto the optical tape via the rotating first light direction means.

The present invention further relates to a method for the optical recording and/or reading of data on an optical tape comprising the following steps. In a first step, the optical tape, which is suitable for storage of binary data in the form of indicia of differing optical characteristics of the optical tape from indicia of corresponding differing optical characteristics in a light beam, is helically passed over a cylindrical outer surface of a drum at a first speed to effect a substantial circumferential wrap thereof at a wrapping location. In a second step, a light beam is generated at a first predetermined wavelength including the linear array of binary data produced by an array of M lasers in a write/read head for direction along a first path. In a third step, an optical rotator is rotated at a second speed around an axis parallel to the direction of the first path for receiving the light beam directed along the first path from the write/read head. In a fourth step, optical means is rotated around an axis parallel to the first path at a third speed, which is twice the second speed. The optical means redirects the light beam propagating along a first path from the rotating optical rotator to a second path for dynamically imaging the linear array of binary data in the form of indicia of differing optical characteristics in a light beam supplied in the second step onto the portion of the optical tape, and helically scanning the optical tape at the wrapping location.

The invention will be better understood from the following more detailed description taken with the accompanying drawings and claims.

BRIEF DESCRIPTION OF THE DRAWINGS

The drawings are not necessarily to scale, and corresponding elements in the various figures are given the same designation number.

DETAILED DESCRIPTION

Figure 1:
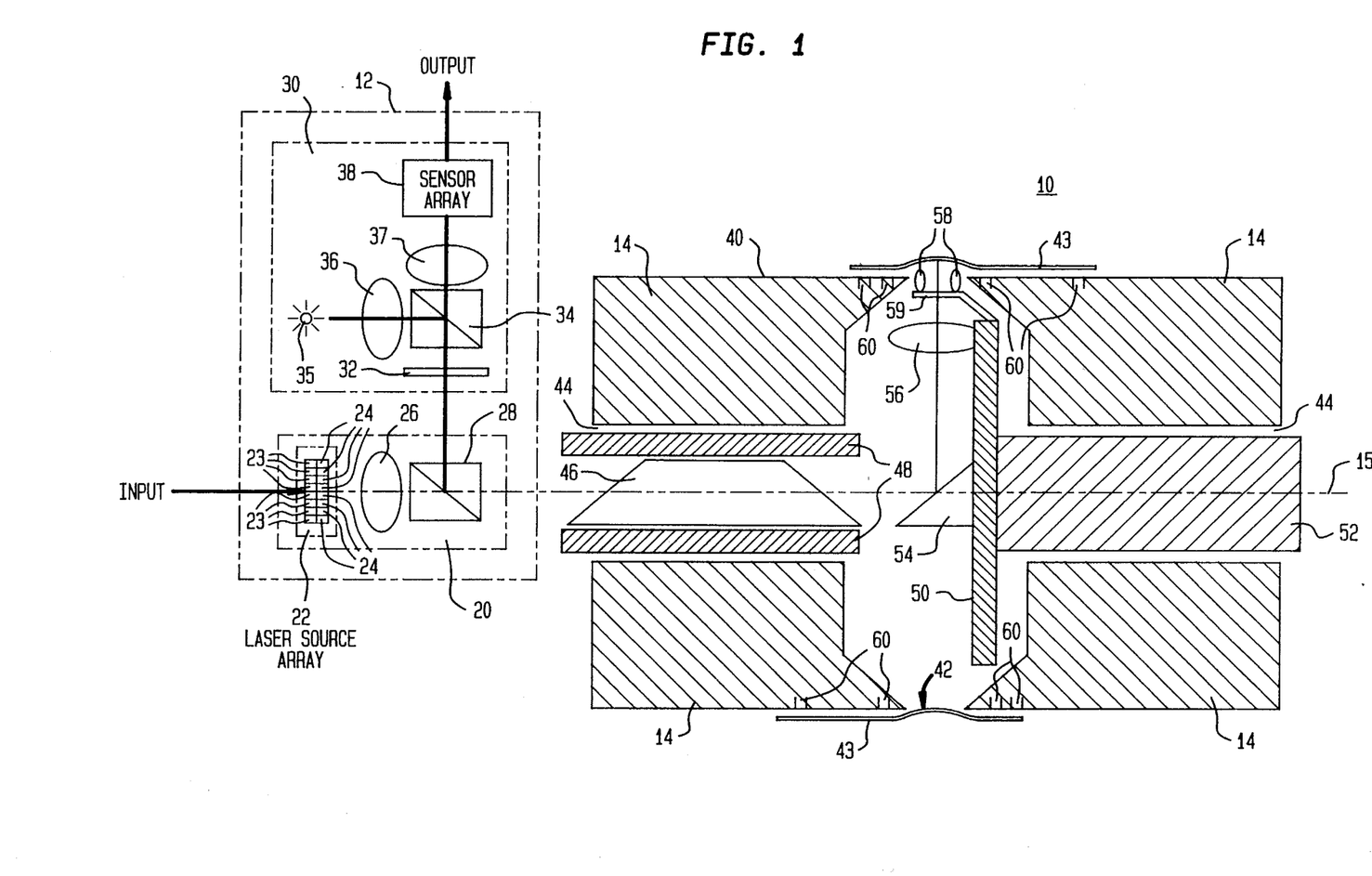
FIG. 1 shows an exemplary arrangement of a helical optical tape data storage system in accordance with the present invention.

Referring now to FIG. 1, there is shown an exemplary arrangement of a helical optical tape data storage system in accordance with the present invention. The helical optical tape data storage system 10 comprises a write/read head 12 (shown within a dashed-line rectangle), and a top cross-sectional view of fixed (stationary) drum 14 having a longitudinal axis 15.

The write/read head 12 comprises a data writing section 20 (shown within a dashed line rectangle) and a data reading section 30 (shown within a dashed line rectangle). The data writing section 20 comprises a laser source array 22 such as a laser/fiber array 22 shown as comprising a plurality of M lasers 23 (only 8 lasers 23 are shown) and a plurality of N optical fibers 24 (only 8 optical fibers 24 are shown) which are linearly or two-dimensionally oriented in a plane that is normal to the longitudinal axis 15, a collimating lens 26, and a dichroic beam-splitter (DBS) 28 which are sequentially oriented along the longitudinal axis 15 of the drum 14. It is to be understood that the values of M and N can comprise numbers which are the same or different values, and that it is assumed in the discussion hereinafter that M equals N (e.g., 64). For purposes of discussion only, it is assumed hereinafter that the laser source array 22 is a linear arrangement but that a preferred arrangement is a two-dimensional array 22 as shown, for example, in U.S. Pat. No. 4,743,091 (D. Gelbart), issued on May 10, 1988. Alternatively, and possibly preferably, the one-dimensional or two-dimensional print head array 22 can be an integrated laser array. The DBS 28 functions to pass light at a predetermined first wavelength and reflect light at a second different wavelength. Each of the plurality of laser 23 (e.g., such as an LED) generates a modulated output light beam (not shown) at the predetermined first wavelength. If a fiber array 24 is used, each laser is directed into, for example, a core of a separate one of the plurality of optical fibers 24 at a first end thereof. The diverging light beams (not shown) emitted from second ends of the optical fibers 24, opposite first ends thereof, act as separate laser sources and are collimated by the collimating lens 26 and directed straight through the DBS 28 and along the longitudinal axis 15 of the drum 14 in a first direction into the drum 14.

The data reading section 30 of the write/read head 12 comprises a quarter-wavelength (45 degree) plate 32, a polarizing beam-splitter (PBS) 34, an illumination source (means) 35, a collimating lens 36, an objective lens 37, and a sensor array 38. The illumination means 35 generates a diverging first light beam (not shown) at a second wavelength which is polarized in a first direction. It is to be understood that the illumination means 35 is a laser, but can comprise any other suitable light generating means. This diverging first light beam is directed through the collimating lens 36 and into the PBS 34. It is to be understood that preferably some illumination shaping means is built into the collimating lens 36 so that the region being illuminated on the optical tape 43 is a line or a substantially narrow rectangle. The PBS 34 is arranged to reflect this collimated and polarized first light beam from the illumination means 35 in a direction normal to the first light beam from the illumination means 35 and towards the quarter-wavelength plate 32. In passing through the quarter-wavelength plate 32, the polarization of the first light beam from the illumination means 35 is rotated by 45 degrees. The polarization rotated first light beam is then directed into the DBS 28 where it is reflected to travel in a first direction along the longitudinal axis 15 of the drum 14. A collimated second light beam propagating along the longitudinal axis 15 of the drum 14 in a second direction out of the drum and towards the DBS 28 having a polarization that matches the 45 degree rotated light beam from the illumination means 35 is reflected by the DBS 28 towards the quarter-wavelength plate 32. The quarter-wavelength plate 32 rotates such 45 degree polarized second light beam by another 45 degrees so that this newly rotated third light beam is now polarized orthogonal (90 degrees) to the collimated and polarized first light beam from the illumination means 35. This newly rotated third light beam enters the PBS 34 and passes straight through the PBS 34 and is imaged on the sensor array 38 via the objective lens 37. It is to be understood that the individual sensors (not shown) of the sensor array 38 can comprise any suitable sensor such as a photodiode.

The drum 14 is shown as a cross-sectional side view through the longitudinal axis 15 thereof, and comprises an outer cylindrical surface 40 defining a first opening 42 therearound over which an optical tape 43 is helically moved around the drum 14. The first opening 42 expands to a predetermined width from the outer surface 40 and essentially extends into the drum 14 in a direction normal to the longitudinal axis 15. Still further, the drum 14 defines a second opening 44 which extends therethrough, is centered along the longitudinal axis 15, and intersects the first opening 42. The drum 14 further comprises an optical rotator 46 such as, for example, a dove prism with a trapezoidal cross-section along the axis 15 and a square cross-section normal to the longitudinal axis 15 which is fixedly mounted in a rotatable mounting 48 (e.g. a cylindrical tube) in the second opening 44, a circular headwheel 50 mounted in the first opening 42 onto a rotatable shaft 52 extending through a portion of the second opening 44, a reflecting means 54, an imaging lens 56, an air bearing slider 58, and air ports 60. The circular headwheel 50 is rotated around the longitudinal axis 15 by a motor (not shown) connected to the shaft 52. The reflecting means 54, the imaging lens 56, and the air bearing slider 58 are fixedly mounted to the headwheel 50 to redirect a light beam propagating along the longitudinal axis 15 in a direction substantially normal thereto and onto the optical tape 43 as the headwheel 50 is rotated.

The air bearing slider 58 is affixed to the headwheel 50 by a mounting 59. Pressurized air is provided through the air ports 60 disposed near the first opening 42 around at least a portion of the drum 14 to suspend the optical tape 43 at a predetermined fixed position above both the outer surface 40 and the first opening 42. The purpose of supplying air through air ports 60 is to prevent contact between the optical tape 43 and the outer cylindrical surface of the drum 14. More particularly, by preventing contact between the optical tape 43 and the drum 14, wearing of the optical tape 43 and an eventual loss of data stored thereon is prevented. As long as contact is prevented between the optical tape 43 and the drum 14, the variation in position of the optical tape 43 above the cylindrical outer surface of the drum 14 is only important along the path of scan of the optical tape 43. Ideally, the height variation of the optical tape 43 along a scan direction should be minimized to minimize (a) the maximum amount that the air bearing slider 58 protrudes above the undeflected surface of the optical tape 43, and (b) the focusing range needed for an active focus control system (not shown) formed by, for example, the moving the objective lens 56 to focus an image of the laser array 24 on the optical tape 43.

More particularly, a nominal depth of focus of the objective lens 56 is, for example, ±1 micron. A drum air bearing (just the air ports 60) generally produces a variation in the position of the optical tape 43 along a scan of, for example, ±35 microns. The air bearing slider 58 functions to provide noncontact focus control to substantially reduce the variation in the position of the optical tape 43 to very close to or at the exemplary ±1 micron requirement along a scan. It is to be understood that the active focus control system and/or the air bearing slider 58, are used to maintain the required exemplary ±1 micron optical tape position variation.

It is to be understood that in accordance with a preferred embodiment of the present invention, the left and right cylindrical sections of the drum 14 are supported in a mounting (not shown) such as a V-block, and the first opening 42 extends completely around the outer surface 40 of the drum 14. This permits the air bearing slider 58 to protrude above the outer surface 40 of the drum 14 while being rotated by the head wheel 50. It is to be understood that the mounting for the left and right cylindrical sections of the drum 14 are designed and positioned to not interfere with both the rotation of the air bearing slider 58 in the first opening 42 and the partial wrapping of the optical tape 43 around the drum 14 in the area of scan. It is to be understood that the right-hand cylindrical section of the drum 14 in FIG. 1 can alternatively be fixedly mounted (not shown) to the shaft 52 so that the headwheel 50 and the right-hand cylindrical section of the drum rotate together. With such arrangement only the left-hand cylindrical section of the drum 14 is mounted in the exemplary V-block mounting. Still further, if no air bearing slider 58 is used, or other means are used for focus control which do not protrude above the cylindrical surface 40 of the drum 14, then the first opening 42 can be made to only extend partially around the drum 14 (e.g., 180 to 270 degrees) in the area of scanning of the optical tape 43. Internally, however, the first opening 42 provides sufficient space for the headwheel 50 (and its mounted elements 54, 56, and 59) and the optical rotator 46 (and its mounting 48) to rotate without contacting internal surfaces of the first and second openings (42 and 44) of the drum 14 or each other.

In operation, the headwheel 50 and optical rotator 46 (with the mounting 48) are rotated around the longitudinal axis 15 at first and second predetermined rotational speeds, respectively, while the optical tape 43 is helically moved over the first opening 42 in the cylindrical outer surface 40 of the drum 14 at a third predetermined speed. The first predetermined rotational speed of the optical rotator 46 around the longitudinal axis 15 is one-half of the second predetermined rotational speed of the headwheel 50 for reasons that are described hereinafter. Concurrent therewith, for writing data onto the optical tape 43, each of M bits of digital data to be stored at a predetermined location on the optical tape 43 is provided to a separate one of the plurality of M lasers 23. Each of the M lasers 23 is arranged to generate a light beam at a first predetermined wavelength which is modulated by the received bit of data. If the laser/fiber printhead is used, the output light beam (not shown) from each of the M lasers 23 is directed into a first end of a core of a corresponding one of the plurality of M optical fibers 24. After propagating through the cores of the plurality of optical fibers 24, the M light beams emerge from a second end of the M optical fibers 24. The M diverging light beams from the optical fibers 24 are collimated by the collimating lens 26, and are directed straight through the DBS 28 since these M light beams are at the first wavelength. The collimated beams from the data writing section 20 propagate along the longitudinal axis 15 through the rotating optical rotator 46 and are reflected by the reflecting means 54 on the rotating headwheel 50. The longitudinal axis 15 is also the optical axis of the optical rotator 46. The reflecting means 54 redirects the collimated writing beams to a direction substantially normal to the longitudinal axis 15 of the drum 14. The collimated writing beams then propagate through the objective lens 56 which images the M writing beams (representing the M bits of data) onto the optical tape 43.

For reading data from the optical tape 43 by the data reading section 30, the illumination means 35 generates a diverging light beam (not shown) at the second wavelength which is polarized in a first direction. This diverging light beam is directed through the collimating lens 36, the PBS 34, the quarter-wavelength plate 32 (where it is rotated by 45 degrees), the DBS 28 (where it is redirected along the longitudinal axis 15), the optical rotator 46, the reflecting means 54, and the objective lens 56 onto the optical tape 43. Light at the second wavelength (and at the 45 degree polarization direction) is reflected from the illuminated optical tape 43 in the area of the M bits to be read. This reflected light in a returning light beam is directed through the objective lens 56 (where it is collimated), and the reflecting means 54 where the returning light beam is directed along the longitudinal axis 15 through the optical rotator 46 and into the DBS 28. Since the returning light beam is at the second frequency, this light beam is redirected by the DBS 28 towards the data read section 30). In the data read section 30, the returning light beam passes straight through each of the quarter-wavelength plate 32 (where its polarization is rotated by 45 degrees to generate a 90 degree polarized light beam), the PBS 34, and the objective lens 37 to project an image of the illuminated helical tape 43 area onto the sensor array 38.

Figure 2:
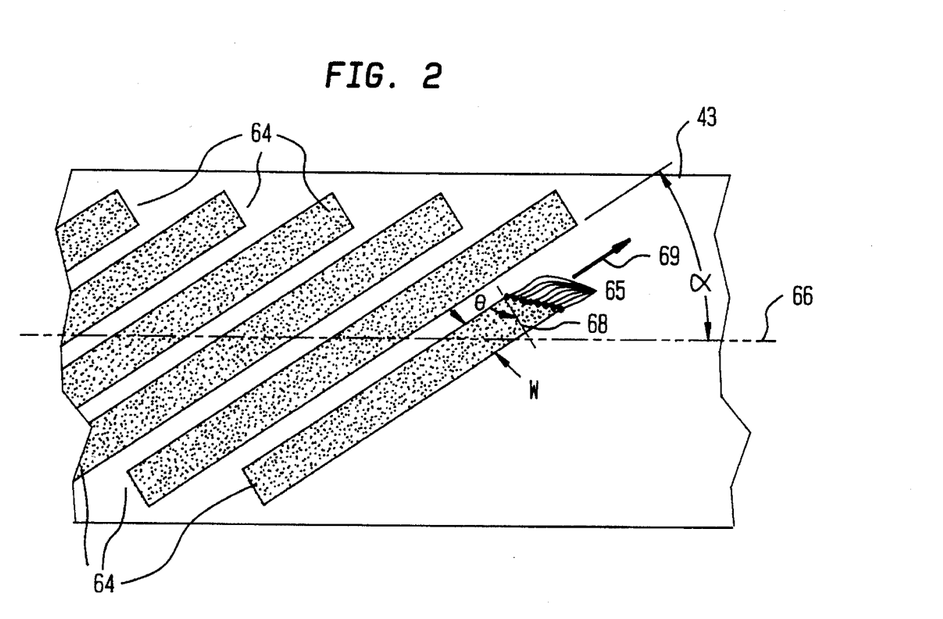
FIG. 2 shows an exemplary helical recording technique of tracks of eight bits on an optical tape in the helical optical tape storage system of FIG. 1 in accordance with the present invention.

Referring now to FIG. 2, there is shown an exemplary helical recording technique of a plurality of tracks 64. Each track 64 comprises a sequence of exemplary bits 65 of data (only eight bits are shown but there can be any number) which are aligned on the optical tape 43 in the helical optical tape storage system 10 of FIG. 1 in accordance with the present invention. The tracks 64 have a predetermined width W and are sequentially aligned next to each other at a predetermined separation, and at a predetermined angle α from the longitudinal axis 66 of the optical tape 43. The arrangement of the tracks 64 is provided by the rotation of the optical rotator 46 (shown only in FIG. 1) around the longitudinal axis 15 at the first predetermined rotational speed, the rotation of the headwheel 50 (shown only in FIG. 1) at the second predetermined rotational speed, and the helical movement of the optical tape 43 around the drum 14 above the first opening 42 at the third predetermined speed while the laser/fiber array 22 is fixedly mounted.

More particularly, without the optical rotator 46 mounted in the second opening 44, as the fixedly mounted laser source array 22 is sequentially generating 8-bits of data to be written on the optical tape 43 and the headwheel 50 is rotating at the second predetermined rotational speed, the sequential linearly arranged 8-bits of data would not be placed parallel to each other with equal spacings along a track 64. Instead, because the laser source array 22 is fixedly mounted while the headwheel is rotating, what starts out as a properly oriented line of 8-bit dots across the width W of a track 64 (a shown in FIG. 2) is caused to rotate slightly as each next sequential line of 8-bits of data is written onto the optical tape 43. In other words, as the headwheel 50 rotates, the sequential line images of the 8-bit dots of data from the laser source array 22 rotate on the helical tape 43 from, for example, being aligned with the longitudinal axis 15 of the drum 14 to being perpendicular to the longitudinal axis 15. This is not desirable since the tracks 64 would appear as twirled ribbons. The optical rotator 46 is used to compensate for such rotational effect of the sequential lines of 8-bit dots of data as a track 64 is written. However, to properly align the sequence of lines of 8-bits of data along a track 64, the optical rotator 46 must be rotated at one-half the speed of the headwheel 50. The spacing between the adjacent tracks 64 is determined by the speed of the helically moving optical tape 43. More particularly, the faster the optical tape 43 is moved, the larger the gap between the tracks. Essentially the optical tape 43 is gradually being moved over the drum 14 at a slow speed with a wrap around the drum 14 of, for example, 180 degrees, while the headwheel 50 rotates at a high speed (e.g., 4000 RPM) to write a very narrow width (e.g., 50 micron) track 64 that does not overlap an adjacent track 64. These system specifications of headwheel 50 and optical tape 43 speed are determinable from known technology applied to prior art magnetic and optical tape systems. Still further, the line of the array of laser sources of the array 22 is angled with respect to a line 68 disposed perpendicular to the scan direction (shown by the arrow 69). Such angle is referred to as "skew", and remains essentially constant along the direction of scan 69. It is to be understood that the "skew" remains constant only when the optical rotator 46 rotates at one-half of the rotational speed of the headwheel 50.

Figure 3:
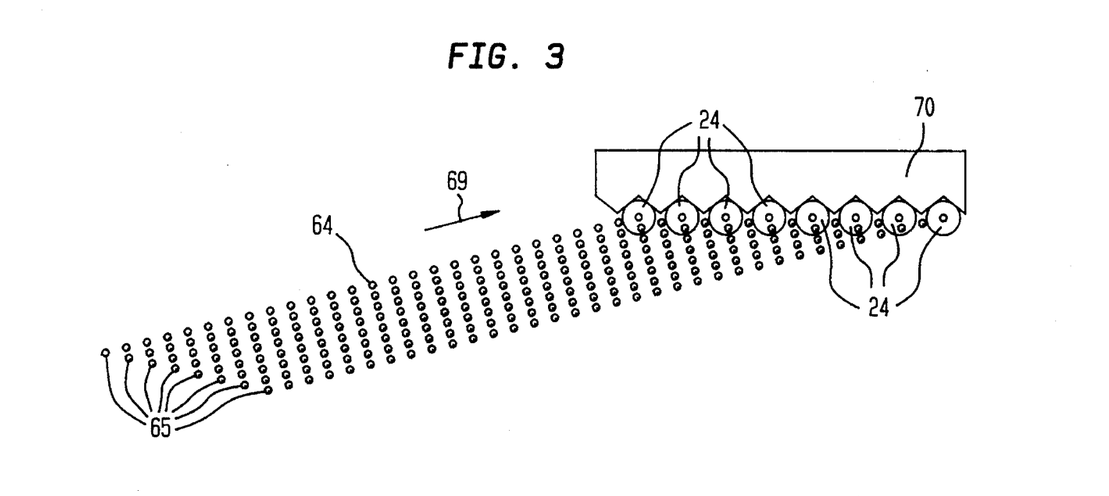
FIG. 3 shows a detail of an exemplary swath of eight dots written by a laser/optical fiber array in the system of FIG. 1 in accordance with the present invention.

Referring now to FIG. 3, there is shown a detail of an exemplary swath (track 64) of sequential line of eight dots written by a linear laser/optical fiber array 22 in the system 10 of FIG. 1 in accordance with the present invention. More particularly, FIG. 3 shows a plurality of eight optical fibers 24 of the linear laser/fiber array 22 of FIG. 1 arranged in a V-block mounting 70 for writing a track 64 of sequential lines of eight bits 65 of data. It is to be understood that a separate laser 23 (shown only in FIG. 1) has its output light beam coupled into an opposite end of each of the optical fibers 24 shown in FIG. 3. The light output of each of the optical fibers 24 is responsible for writing one line of bits 65 along the track 64. The linear array of optical fibers 24 is angled (skewed) relative to the scan direction 69 shown in FIG. 2 in order to reduce the spacing between the adjacent lines of dots on the optical tape 43 (shown only in FIGS. 1 and 2) written by adjacent optical fibers 24. As is shown in FIG. 3, although the array of optical fibers 24 is skewed relative to the scan direction 69, each row of 8 associated dots (bits 65) is formed across each track. This is accomplished by pulsing a line of the lasers 23 (shown in FIG. 1) in a predetermined sequence (appropriately delaying the pulsing of sequential lasers 23 in a line of the array 24) so that a straight line (row) of eight associated dots (bits 65) normal to the direction of scan 69 is produced. For example, a skew angle θ (shown only in FIG. 2) of seventy degrees relative to the scan direction 69 (shown only in FIG. 2) provides an approximate 1.5 micron line spacing with an optical fiber 24 spacing of 25 microns (demagnified to 5 microns by the objective lens 56 of FIG. 1). It is to be understood that the ends of the optical fibers 24 shown in FIG. 3 can represent individual laser sources in an integrated laser array, or the image of a row of lasers from a two-dimensional print head.

Figure 4:
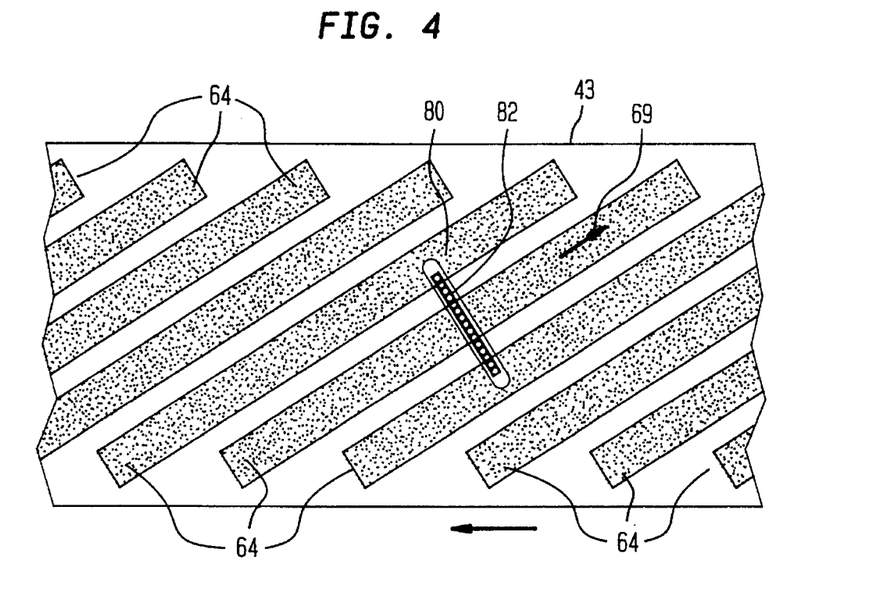
FIG. 4 shows an exemplary helical reading technique of tracks of eight bits on an optical tape recorded in the manner shown in FIG. 2 in accordance with the present invention.

Referring now to FIG. 4, there is shown an exemplary helical reading technique of tracks 64 of an exemplary line of eight bits 65 (only shown in FIGS. 2 and 3) on an optical tape 43 recorded in the manner shown in FIG. 2 in accordance with the present invention. Data stored on the optical tape 43 is read by illuminating an area or line 80 of the optical tape 43 using the light beam from the illuminating means 35 (shown only in FIG. 1), and imaging the reflected light onto the sensor array 38 (shown only in FIG. 1). It is to be understood that the optics of the lenses 36 and 37, the PBS 34, the plate 32, the DBS 28, the optical rotator 46, the reflecting means 54, and the lens 56 shown in FIG. 1 are used to read the data stored on the optical tape as described hereinbefore. The shape and subsequent magnification of the light beam from the illumination means 35 are arranged in any known manner such that a data area 82 (e.g., a line of pixels) imaged onto the sensor array 38 is illuminated uniformly in time. It is to be understood that the data area 82 corresponds to the outline of the sensor array 38 that is imaged onto the optical tape 43 along with the illuminated area or line 80.

The illumination means 35 and the sensor array 38 are aligned relative to each other so that their images on the optical tape 43 have the same skew angle θ (preferably zero degrees as shown in FIG. 4) and scan the same track 64 in the scan direction 69. It is to be understood that images of the illumination means 35 (as shown by illuminated area or line 80) and the sensor array 38 on the optical tape 43 (shown by data area 82) must overlap, while the image of the laser source array 22 (or printhead) on the optical tape 43 is preferably slightly advanced along the direction 69 of scan. Such arrangement of the laser source array 22 and sensor array 38 images allow an Immediate-Read-And-Verify (IRAV) process to occur. More particularly, data stored on the optical tape 43 is read by sampling the outputs of the individual sensors (not shown) of the sensor array 38 as the imaged linear dot pattern stored on the optical tape 43 is scanned. In accordance with a reading technique of the present invention, the image of the sensor array 38 on the optical tape 43 is wider than the width of the track 64 being read. This provides a tracking tolerance in order to reduce track alignment requirements, and to allow for dimensional stability effects in the optical tape.

There are a number of techniques available for extracting data from parallel outputs (not shown) of the sensor array 38. For example, a centrally located control track (not shown) of a line of dots along a track 64 can be written on the optical tape 43 along with the linear array of M bits of data. Such control track can be written onto the optical tape at the start of scan, before the writing of data is started, and continued along the entire track 64 during the writing of the data. The sensor array 38 can then have, for example, three or four sensors per dot spacing on the optical tape for a 3× or 4× oversampling, respectively. As the image of a written swath (line of dots of data) on the optical tape 43 is scanned over the sensor array 38, the control track is detected first (since it starts before data is written) and identifies the center of the swath (track 64). By locking onto this control track, and knowing how many sensors per dot spacing there are, the particular sensors aligned with the center lines of written data are determined. This occurs even when the swath of the optical tape 43 that is being read does not specifically follow the center line of the written swath being read. Thus, the control track aids in determining where (in what sensors) to look for dots (bits) of data. Similarly, by synchronizing the dots of the control track with a clock (not shown) used to write a swath of data, the control track is used to disclose "when" to look for data. A data detection algorithm used with the output signals of the sensor array 38 can be any suitable algorithm such as to simply threshold detect the designated sensors at the designated times of pulses of the clock. Still further, either analog current outputs of the sensors, or integrated current outputs of the sensors, of the sensor array 38 can be used, depending on noise and sensitivity considerations.

Figure 5:
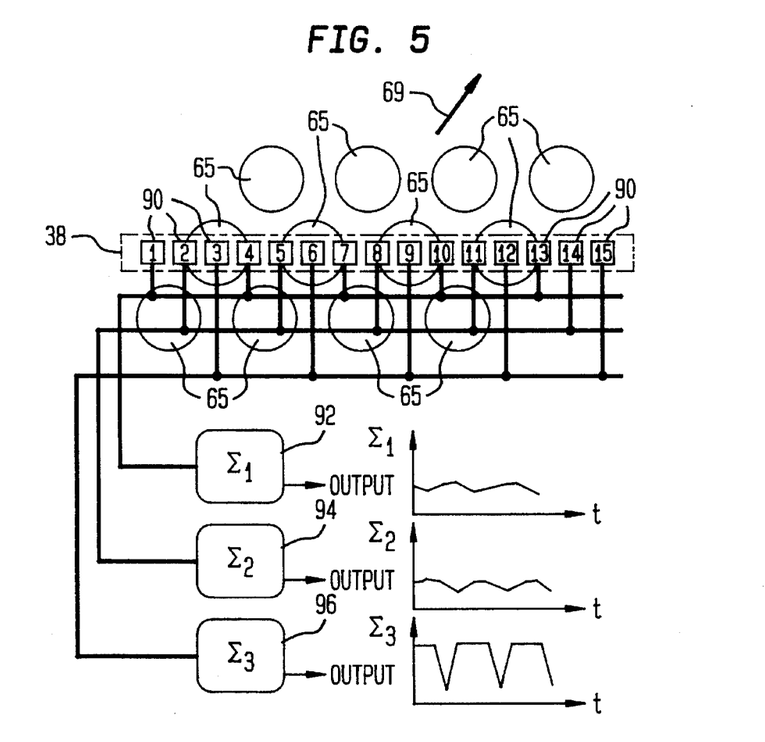
FIG. 5 shows an exemplary helical reading arrangement for reading exemplary 4-bit wide tracks of data on an optical tape recorded in the manner shown in FIG. 2 in accordance with the present invention.

Referring now to FIG. 5, there is shown an exemplary helical reading arrangement for reading exemplary 4-bit wide tracks 64 of data on the optical tape 43 recorded in the manner shown in FIG. 2 in accordance with the present invention. More particularly, FIG. 5 shows a plurality of data dots 65 stored on the helical tape 43 (shown only in FIG. 2) along the scan direction 69 (shown in FIG. 4) as imaged onto the sensor array 38 (shown within a dashed line rectangle). The sensor array 38 comprises an exemplary plurality of fifteen sensors (e.g., photodiodes) 90 where the first, fourth, seventh, tenth, and thirteenth sensors 90 are connected to a first summation circuit ($\Sigma_1$) 92; the second fifth, eighth, eleventh, and fourteenth sensors 90 are connected to a second summation circuit ($\Sigma_2$) 94; and the third, sixth, ninth, twelfth, and fifteenth sensors 90 are connected to a third summation circuit ($\Sigma_3$) 96.

In operation, each of the first, second, and third summation circuits 92, 94, and 96 add the signal amplitude values received from the associated sensors 90 during each instant of time, and generates an output signal representative of such summed amplitudes. In FIG. 5, an exemplary curve of "output amplitude sum" versus "time" is shown for each of the summation circuits 92, 94, and 96 as the optical tape 43 is moved along the direction of scan 69 relative to the location of the sensors 90 relative to the imaged data dots 65. With the sensors 90 positioned as shown in FIG. 5, the maximum summed amplitude output signal from the first and second summation circuits 92 and 94 are less than the maximum summed amplitude output signal from the third summation circuit 96. This results from the all but one of the sensors 90 associated with the first and second summation circuits 92 and 94 not being disposed near or at the center of a data dot 65, but being positioned near an edge of the data dots 65 as they are moved below the sensor array 38. On the other hand, all but one of the sensors 90 associated with the third summation circuit 96 are moved at or near the center of the data dots as they are moved below the sensor array 38. Therefore, the sensors 90 corresponding to the sum with the largest maximum amplitude are the sensors 90 that are most central with the dot center lines (not shown).

It is to be understood that if the image of the data dots 65 shown in FIG. 5 are moved sideways in either direction relative to the sensor array 38, then one of the first or the second summation circuits (92 or 94) produces a sum with a larger maximum amplitude than that generated by the other two summation circuits. A time to sample the outputs from the data dots 65 (i.e., the clock information) by a computer or other user circuit (not shown) coincides with the instants of time when the sum from the summation circuit providing a largest amplitude value reaches a local maximum. It is to be understood that the minimum amplitude value from the associated summation circuit is not zero when each of the sensors 90 of the sensor array 38 connected to a particular summation circuit 92, 94, or 96 are not disposed over a part of a data dot 65. This results from the fact that although a data dot reflects a first predetermined amount of light, some second lesser amount of light is generally reflected from the illuminated optical tape from the area between the data dots.

Figure 6:
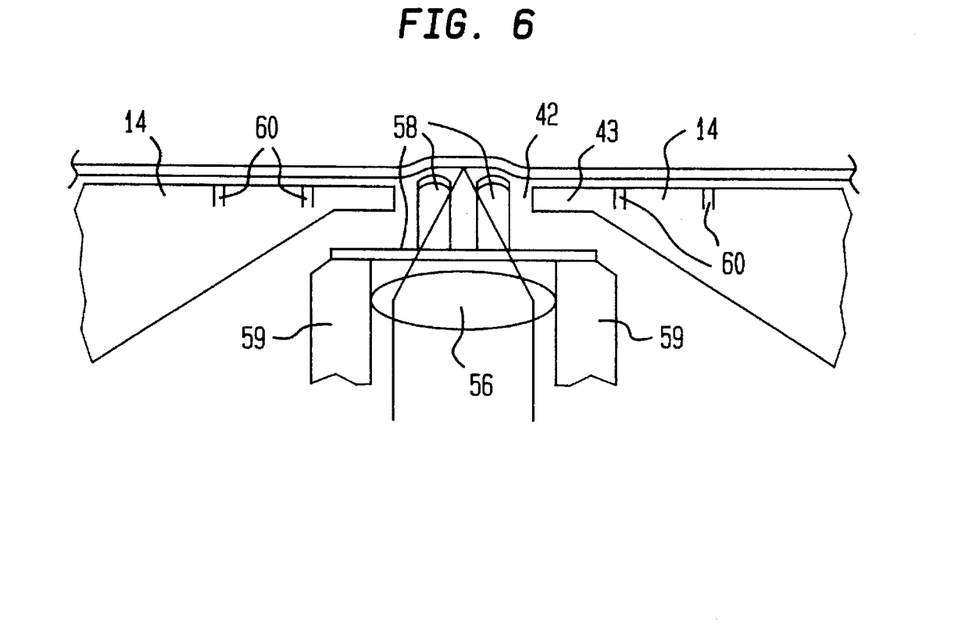
FIG. 6 shows a side view of an exemplary slider and focus control arrangement for use in the helical optical tape data storage system of FIG. 1.
Figure 7:
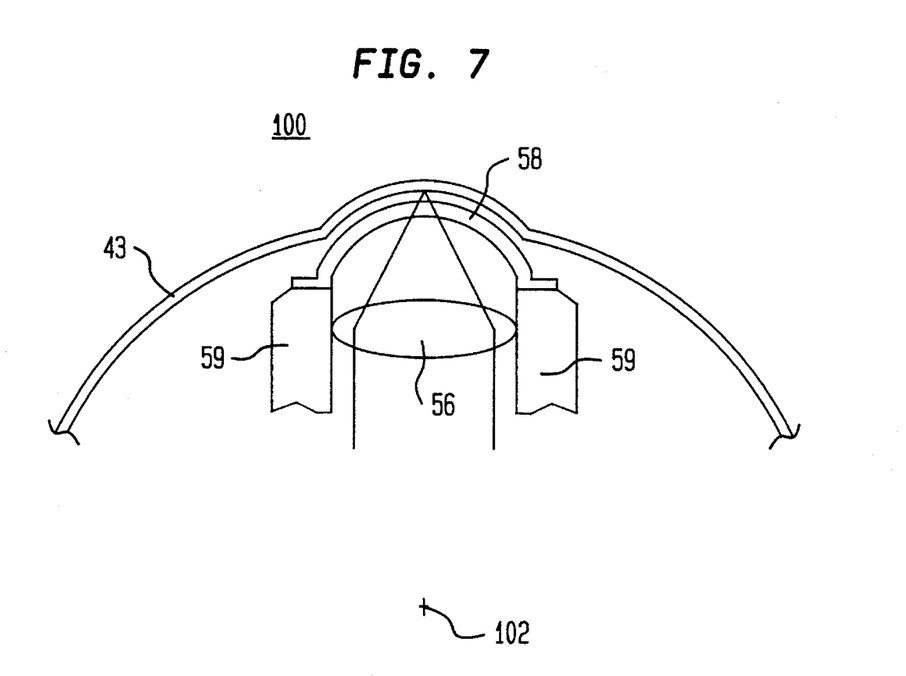
FIG. 7 shows an axial view of the exemplary slider and focus control arrangement of FIG. 6.

Referring now to FIGS. 6 and 7, FIG. 6 shows a partial side view of an exemplary slider and focus control arrangement 100 for use in the helical optical tape data storage system 10 of FIG. 1, and FIG. 7 shows a partial axial view of the exemplary slider and focus control arrangement 100 of FIG. 6 around an axis 102 corresponding to the longitudinal axis 15 shown in FIG. 1. The slider and focus control arrangement 100 comprises the objective lens 56, the air bearing slider 58, and the air bearing slider mounting 59 disposed in the first opening 42 of the drum 14 in the manner shown in FIG. 1. Pressurized air is provided under the optical tape 43 by the air ports 60 to suspend the optical tape 43 above the drum 14. Focus control is accomplished by using air bearing sliders 58 to position the optical tape 43 in a focal plane of the objective lens 56. These air bearing sliders 58 act like skis riding on a thin film of air below the optical tape 43. Because of the high stiffness of the air film between the air bearing sliders 58 and the optical tape 43, the position of the optical tape 43 remains substantially fixed relative to the objective lens 56 regardless of the position along the direction of scan, and regardless of any variation in separation distance between the drum 14 and the optical tape 43. Ideally, the optical tape 43 remains within focus without contacting the air bearing slider 58. It is to be understood that the slider and focus control arrangement 100 of FIGS. 6 and 7 is merely an exemplary arrangement, and that any other suitable arrangement may be substituted therefor.

Figure 8:
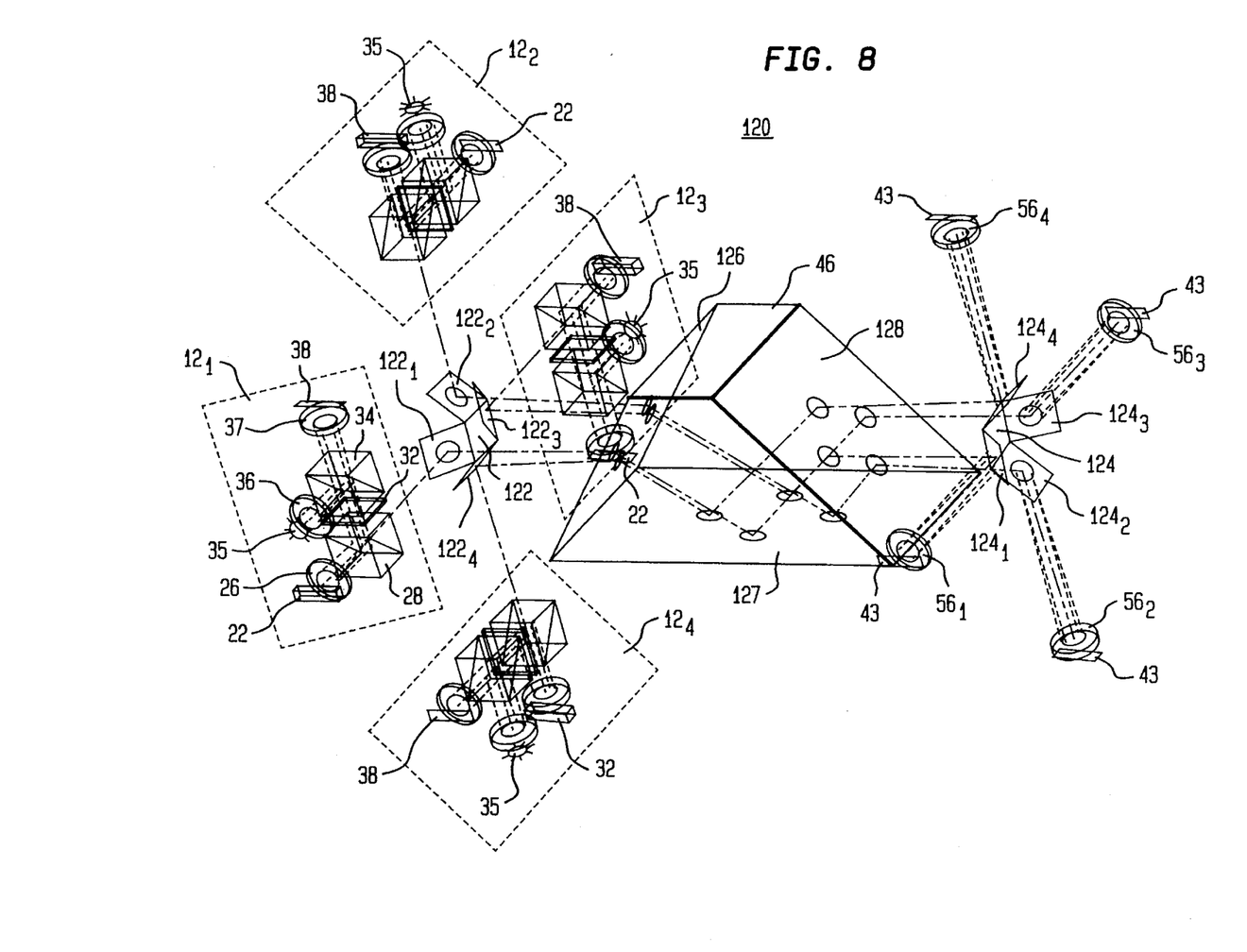
FIG. 8 shows a view in perspective of an exemplary arrangement of a helical optical tape data storage system using multiple arrangements of the helical optical tape data storage system of FIG. 1.

Referring now to FIG. 8, there is shown a view in perspective of an exemplary arrangement of a helical optical tape data storage system 120 in accordance with the present invention which uses multiple arrangements of the helical optical tape data storage system 10 of FIG. 1. For purposes of simplicity, only the optical components of the helical optical tape data storage system 120 are shown. In other words, for purposes of simplicity, the drum 14, the headwheel 50, the shaft 52, and the air bearing sliders 58 of FIG. 1 have not been shown in the helical optical tape data storage system 120. The helical optical tape data storage system 120 comprises a first write/read head $12_1$, a second write/read head $12_2$, a third write/read head $12_3$, a fourth write/read head $12_4$ (each write/read head being shown in a separate dashed line rectangle), a first fold mirror 122, the optical rotator 46, a second fold mirror 124, a first objective lens $56_1$, a second objective lens $56_2$, a third objective lens $56_3$, and a fourth objective lens $56_4$.

Each of the write/read heads $12_1$, $12_2$, $12_3$, and $12_4$ comprises the elements shown in the write/read head 12 of FIG. 1. More particularly, the write/read head $12_1$ comprises the laser source array 22, the collimating lens 26, and the dichroic beam-splitter (DBS) 28 for the writing section thereof, and the quarter-wavelength plate 32, the polarizing beam-splitter (PBS) 34, the illumination means 35, the collimating lens 36, the objective lens 37, and the sensor array 38 for the reading section thereof. It is to be understood that each of the other write/read head $12_2$, $12_3$, and $12_4$ comprise the same elements of which only the laser source array 22, the illuminating means 35, and the sensor array 38 are shown with designation numbers for figure clarity purposes. The write/read heads $12_1$, $12_2$, $12_3$, and $12_4$ are disposed at separate radial angles around the first fold mirror 122.

In operation, for writing data by the first write/read head $12_1$, the laser source array 22 generates a data light beam (not shown) which is collimated by the collimating lens 26 and directed through the DBS 28 towards a first mirror $122_1$ of the first fold mirror 122. The first mirror $122_1$ redirects the data light beam from the write/read head $12_1$ towards a first predetermined area of a first sloped surface 126 of the optical rotator 46. The data light beam is refracted by the first sloped surface 126 and directed towards a first predetermined area of a bottom surface 127 of the optical rotator 46 where it is reflected towards a first predetermined area of a second sloped surface 128 of the optical rotator 46 opposite the first sloped surface 126. This data light beam is refracted at the second sloped surface 128 and is directed towards a first mirror $124_1$ of the second fold mirror 124 which is mounted on the headwheel 50 (shown only in FIG. 1). The first mirror $124_1$ redirects the data light beam towards the first objective lens $56_1$ (also mounted on the headwheel 50 of FIG. 1) where the data light beam is imaged onto a separate section of an optical tape 43.

For reading data written on the optical tape 43 by the first write/read head $12_1$, the illumination means 35 in the write/read head $12_1$ directs its illuminating light beam onto the separate section of an optical tape 43 along the same path used to write data. More particularly, the illuminating light beam from the illumination means 35 is directed via the collimating lens 26, the quarter-wave plate 32, the PBS 32, the DBS 28, the first mirror $122_1$ of the first fold mirror 122, the optical rotator 46, the first mirror $124_1$ of the second fold mirror 124 and the first objective lens $56_1$ onto the separate section of the optical tape 43. The light reflected from the illuminated separate section of the optical tape 43 returns in a returning light beam over the same path, and is imaged onto the sensor array 38 of the first write/read head $12_1$ by the objective lens 37.

Each of the other write/read heads $12_2$, $12_3$, and $12_4$ operate concurrently in a similar manner for writing and reading data on a separate section of the same optical tape 43. More particularly, the second write/read head $12_2$ uses a path via a second mirror $122_2$ of the first fold mirror 122, second areas of each of the first sloped surface 126, the bottom surface 127, and the second sloped surface 128 of the optical rotator 46, a second mirror $124_2$ of the second fold mirror 124, and the second objective lens $56_2$ to write and read data on a second separate section of the same or different optical tape 43. The third write/read head $12_3$ uses a path via a third mirror $122_3$ of the first fold mirror 122, third areas of each of the first sloped surface 126, the bottom surface 127, and the second sloped surface 128 of the optical rotator 46, a third mirror $124_3$ of the second fold mirror 124, and the third objective lens $56_3$ to write and read data on a third separate section of the same or different optical tape 43. The fourth write/read head $12_4$ uses a path via a fourth mirror $122_4$ of the first fold mirror 122, fourth areas of each of the first sloped surface 126, the bottom surface 127, and the second sloped surface 128 of the optical rotator 46, a fourth mirror $124_4$ of the second fold mirror 124, and the fourth objective lens $56_4$ to write and read data on a fourth separate section of the same or different optical tape 43.

The optical configuration of the helical optical tape data storage system 120 for reading and writing data onto separate sections of the same optical tape 43 is essentially the same as in the helical optical data storage system 10 of FIG. 1 except for the added first fold mirror 122 between the DBS 28 and the optical rotator 46. Still further, the first, second, third, and fourth objective lenses $56_1$, $56_2$, $56_3$, and $56_4$ are mounted on the headwheel 50 shown in FIG. 1 at, for example, separate 90 degree radial points around the headwheel 50. Furthermore, the second fold mirror 124 is also mounted on the headwheel 50 with the first, second, third, and fourth mirrors $124_1$, $124_2$, $124_3$, and $124_4$ being oriented to direct each of the four write and read light beams towards the corresponding objective lenses $56_1$, $56_2$, $56_3$, and $56_4$. An advantage of the helical optical tape data storage system 120 is that the system 120 provides a way to achieve a higher data rate than the system 10 of FIG. 1 without increasing the requirements for (a) a field of the objective lens 56 of FIG. 1, (b) the number of channels in the sensor array 38 of FIG. 1, (c) the channel data rate for the sensor array 38 of FIG. 1, and (d) the laser power and pulse rate of the laser source array 22 of FIG. 1.

Figure 9:
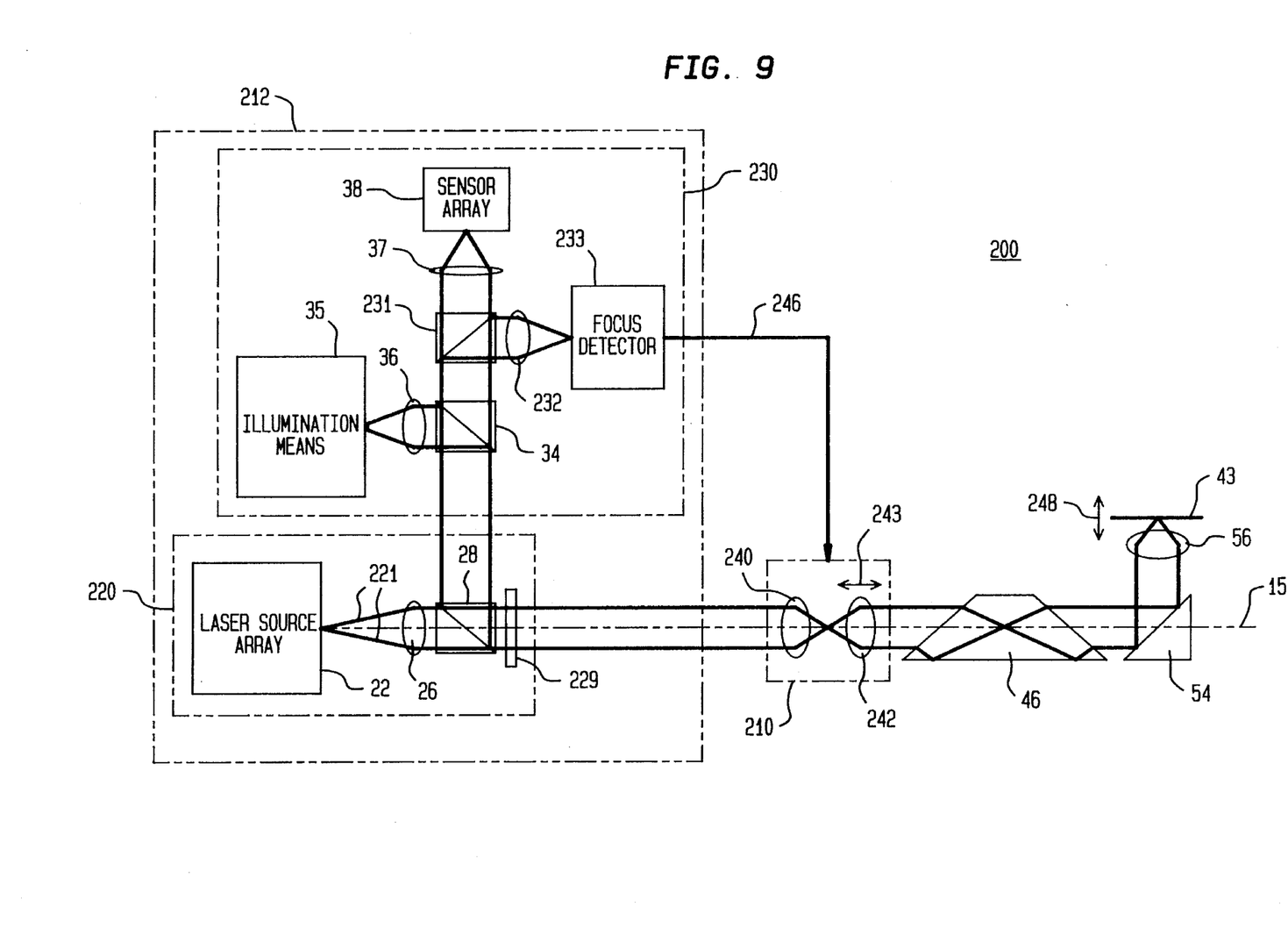
FIG. 9 shows a helical optical tape data storage system 200 in accordance with the present invention and which is similar to the helical optical tape data storage system 10 of FIG. 1 but includes a focus correction arrangement.

Referring now to FIG. 9, there is shown only optical elements used in a helical optical tape data storage system 200 (that is similar to the helical optical tape data storage system 10 of FIG. 1) which includes a focus correction arrangement in accordance with the present invention. Corresponding elements of the optical tape data storage systems 10 and 200 are given the same designation numbers and perform the same function. The helical optical tape data storage system 200 comprises a write/read head 212 (shown within a dashed-line rectangle), and a focus corrector 210 (shown within a dashed-line rectangle), a optical rotator 46, a reflector 54, and an objective lens 56 which are associated with a fixed drum 14 (only shown in FIG. 1) having the longitudinal axis 15.

The write/read head 212 comprises a data writing section 220 (shown within a dashed line rectangle) and a data reading section 230 (shown within a dashed line rectangle). The data writing section 220 comprises a laser source array 22 comprising a plurality of M lasers (not shown) which are linearly oriented normal to the longitudinal axis 15, a collimating lens 26, a dichroic beam-splitter (DBS) 28, and a quarter-wavelength plate 229 which are sequentially oriented along the longitudinal axis 15. The DBS 28 functions to pass light at a predetermined first wavelength and reflect light at a second different wavelength. In operation, a diverging data information light beam 221 at a first polarization and the first wavelength is emitted from the laser source array 222 and is collimated by the collimating lens 26. The collimated light beam 221 is directed straight through the DBS 28 and enters the quarter-wavelength plate 229 where it has its first polarization direction rotated by 45 degrees before continuing along the longitudinal axis 15 in a first direction and onto the optical tape 43.

The data reading section 230 of the write/read head 212 comprises a polarizing beam-splitter (PBS) 34, an illumination source (means) 35, a collimating lens 36, a first objective lens 37, a sensor array 38, a beam-splitter 231, a second objective lens 232, and a focus detector 233. The illumination means 35 generates a diverging light beam at the second wavelength which is polarized in a first direction. It is to be understood that the illumination means 35 is a laser, such as a diode laser, but can comprise any other suitable light generating means. This diverging illumination light beam is directed through the collimating lens 36 and into the PBS 34. The PBS 34 is arranged to reflect this collimated and first directionally polarized illumination light beam to a direction normal thereto and into the DBS 28 where it is reflected (because it is at the second wavelength) to propagate in the first direction along the longitudinal axis 15. In passing through the quarter-wavelength plate 32, the polarized illumination light beam from the illumination means 35 is rotated 45 degrees.

A returning collimated second light beam propagating along the longitudinal axis 15 of the drum 14 in a second direction towards the DBS 28 having a polarization that matches the 45 degree rotated illumination light beam from the illumination means 35 enters the quarter-wavelength plate 32. The quarter-wavelength plate 32 rotates such 45 degree polarized returning light beam by another 45 degrees so that this newly rotated returning light beam is now polarized orthogonal (90 degrees) to the collimated and polarized illumination light beam from the illumination means 35. This newly rotated returning light beam is reflected by the DBS 28 and passes straight through the PBS 34 and enters the beam-splitter 231. In the beam-splitter 231, a portion of the light of the returning light beam is directed towards the first objective lens where it is imaged on the sensor array 38. A second half of the light from the returning light beam is directed towards the second objective lens 232 where it is imaged on the focus detector 233.

The data light beam from the data writing section 220 of the write/read head 212 is directed along the longitudinal axis 15 into the focus corrector 210. The focus corrector 210 comprises a first lens 240 which is fixedly mounted, and a second lens 242 which is selectively movable along the longitudinal axis 15 as shown by a dual-headed arrow 243.

The light beam exiting the focus corrector 210 is directed via the optical rotator 46, the reflecting means 54, and the objective lens 56 for imaging on the optical tape 43. The illumination light beam from the illumination means 35 in the data reading section 230 is also directed from the quarter-wavelength plate 229 via the focus corrector 230, the optical rotator 46, the reflecting means 54, and the objective lens 56 for illuminating a predetermined section of the optical tape 43. The light reflected from the illuminated section of the optical tape 43 is directed back in the returning light beam via the objective lens 56, the reflecting means 54, the optical rotator 46, the focus corrector 210, the quarter-wavelength plate 32, the DBS 28, the PBS 34 and to the beam-splitter 231. At the beam-splitter 231, a portion of the light received in the returning light beam is directed to the sensor array 38, and the remaining portion of the light in the returning light beam is directed to the focus detector 233 via the objective lens 232.

The focus detector 233 detects whether the received image of the optical tape 43 is in focus or not. If the received image is not in focus, the focus detector 233 generates control signals via line 246 to the focus corrector 210. Such control signals are used by the focus corrector 233 to move the second lens 242 in a predetermined direction along the longitudinal axis 15 to bring the image into focus, or appropriately out of focus, at the focus corrector 233 and thereby into focus at the sensor array 38. Therefore, as the optical tape 43 moves towards or away from the objective lens 56 in a direction shown by a dual-headed arrow 248, a change in focus of the image of the optical tape occurs at the sensor array 38 and the focus corrector 233. Therefore, the combination of the focus detector 233 and the focus corrector 210 are used to compensate for such change in focus.

It is to be appreciated and understood that the specific embodiments of the invention described hereinbefore are merely illustrative of the general principles of the invention. Various modifications may be made by those of ordinary skill in the art which are consistent with the principles set forth. For example, other suitable arrangements of the write/read head can be substituted for the write/read heads 12 and 212 of FIGS. 1 and 9, respectively, that function in the manner described hereinbefore. Still further, for a single write/read head 212 of FIG. 9, the quarter-wavelength plate 229 can also be located in the path between the DBS 28 and the PBS 34 as shown for the quarter-wavelength plate 32 in FIG. 1. Furthermore, it is to be understood that the DBS 28 can be chosen so that it reflects the write beam from the laser source array 22 and directly transmits the read beam from/to the read section 30.

What is claimed is:

1. A system for the optical recording or playback of data comprising:

means for passing an optical tape, which is suitable for storage of binary data in the form of indicia of differing optical characteristics to those of the optical tape, over a cylindrical outer surface of a drum;

first head means including a data writing section comprising an array of M lasers for generating a light beam at a first predetermined wavelength including indicia of differing optical characteristics of an array of M separate binary data, said light beam being directed along an optical path;

first optical means to effect an imaging of the light beam from the first head means onto a swath having a width of M binary databits forming a predetermined portion of the optical tape, the first optical means comprising:

an optical rotator for receiving the light beam from the first head means that is propagating along the optical path, the optical rotator being rotated around its optical axis; and light directing means rotating around an axis parallel to the optical path incident to said light directing means for receiving the light beam propagating along the optical path from the optical rotator, said light directing means redirecting and focusing the light beam onto the predetermined portion of the optical tape using a focusing control arrangement, said focusing control arrangement including a self-acting mechanism for maintaining a position of said optical tape, said self-acting mechanism not substantially contacting said tape and protruding above an unperturbed position of the tape.

2. The system of claim 1 wherein the optical rotator is disposed in an opening defined by the cylindrical drum such that the optical path through the optical rotator is centered on a longitudinal axis of the cylindrical drum.

3. The system of claim 2 wherein the light directing means comprises:

a cylindrical headwheel which is rotated around the longitudinal axis of the cylindrical drum;

reflecting means mounted on the headwheel for redirecting the light beam towards the moving optical tape; and an objective lens mounted on the headwheel between the reflecting means and the optical tape for imaging the light beam from the first head means onto the optical tape.

4. The system of claim 1 wherein the array of lasers is oriented to produce an image thereof on the optical tape which is skewed by a predetermined angle relative to a direction of scan of the optical tape, and the lasers of the array are sequentially pulsed to produce rows of the indicia of differing optical characteristics of the array of binary data at the optical tape which are normal to the direction of scan of the optical tape.

5. The system of claim 1 wherein the first head means further comprises a data reading section comprising:

illumination means for generating a first light beam at a second predetermined wavelength and a first polarization direction to illuminate a predetermined portion of the optical tape at any instant of time; and a light sensing array comprising at least M light detectors for detecting the optical characteristics of a reflected image of an array of binary data stored at the illuminated predetermined portion of the optical tape and converting such detected optical characteristics of the array of binary data into representative electrical signals where an image on the light sensing array of the optical tape is wider than a swath of M parallel binary data tracks formed thereon.

6. The system of claim 5 wherein the data writing section further comprises:

means for converting the light beam from the array of lasers into a collimated light beam; and a dichroic beam splitter (DBS) for directing each of (a) the collimated light beam at the first frequency arriving from the array of lasers, and (b) the light beam at the second predetermined wavelength and polarization direction from the data reading section, along the optical path towards the optical rotator.

7. The system of claim 6 wherein the data reading section further comprises:

a polarization beam-splitter (PBS) for directing the first light beam from the illumination means at the second wavelength and the first polarization direction towards the dichroic beam-splitter (DBS) of the data writing section for redirection along the optical path, and for directing the second light beam which enters the PBS from a direction of the DBS at the second wavelength and the second polarization direction normal to the first polarization direction through the PBS to the light sensing array; and a quarter-wavelength plate, disposed in the optical path between the PBS and the optical tape, for rotating the first light beam from the illumination means at the second wavelength and the first polarization direction propagating towards the optical tape by 45 degrees to produce a third light beam, and for rotating a fourth light beam having the wavelength and polarization of the third light beam which is produced by a reflection of the optical tape illuminated by the third light beam by an additional 45 degrees to produce the second light beam which is directed towards the PBS.

8. The system of claim 1 further comprising:

at least one second head means, each second head means comprising an array of M lasers, the second head means being arranged for supplying a separate light beam including indicia of differing optical characteristics of an array of M separate binary data, said separate light beam propagating through the optical rotator along a separate optical path parallel to the first optical path through the optical rotator of the light beam generated by the first head means; and at least one second optical means, each second optical means being associated with a corresponding second head means for effecting an imaging of the indicia of differing optical characteristics of the light beam from the associated second head means onto a separate portion of the optical tape, each second optical means comprising a separate second light directing means rotating around an axis parallel to the optical path incident to said second light directing means for redirecting the light beam propagating along the path from the optical rotator onto the separate portion of the optical tape using a second focusing control arrangement.

9. The system of claim 8 further comprising a fold mirror comprising a plurality of mirrors folded at a predetermined angle relative to the optical path from the optical rotator, each mirror forming a separate one of each of the first optical means and the at least one second optical means for effecting the dynamic imaging of the indicia of differing optical characteristics of the light beam from the associated first head means and each second head means onto the separate portion of the optical tape.

10. The system of claim 1 wherein the light directing means comprises:

an imaging lens having a predetermined nominal depth of focus; and wherein said focusing control arrangement maintains the position of the optical tape within the predetermined nominal depth of focus of the imaging lens.

11. The system of claim 10 wherein the self-acting mechanism comprises an air bearing slider, said air bearing slider protruding from the drum and not substantially contacting the optical tape during a writing or reading operation while maintaining the optical tape suspended on a layer of gas over the slider at a focal area of the imaging lens.

12. A method for optically recording or playing back data, the method comprising:

passing optical tape material over an outer surface of a drum;

supplying light to effect scanning of the tape material;

directing the light beam in an optical path towards the tape material being passed over the drum;

passing the tape material over a self-acting mechanism protruding above said outer surface of said drum and not substantially contacting said tape to effect focusing of the light onto the tape material; and reading tracks of data bits from said optical tape using a tracking arrangement.

13. The method of claim 12, wherein the step of passing the tape material over said self-acting mechanism further comprises the steps of:

generating a film of air between said tape material and said self-acting mechanism, and supporting the tape above said outer surface of said drum using said film of air.

14. An optical tape data storage system comprising:

a drum comprising a cylindrical outer surface defining a first opening around at least a portion thereof disposed normal to a longitudinal axis of the drum over which an optical tape is moved, the drum further defining a second opening parallel to a longitudinal axis of the drum which intersects the first opening;

an optical rotator which is rotated in the second opening of the drum around an axis parallel to the longitudinal axis of the drum;

a cylindrical headwheel disposed in the first opening of the drum for rotation around the longitudinal axis of the drum;

first light directing means mounted on an end of the cylindrical headwheel for converting a substantially collimated light beam representative of indicia of differing optical characteristics of an array of binary data at an output surface of the optical rotator into an image of the indicia of differing optical characteristics of the array of binary data on a predetermined section of the optical tape; and a first head comprising a data writing section comprising an array of M lasers for generating the collimated light beam at a first predetermined wavelength including the indicia of differing optical characteristics of the array of M separate binary data, said light beam being directed by the first head along an optical path through the rotating optical rotator and then via the rotating first light direction means said light beam being redirected and focused onto the predetermined portion of the optical tape using a focusing control arrangement, said focusing control arrangement including a self-acting mechanism for maintaining a position of said optical tape, said self-acting mechanism not substantially contacting said tape and protruding above an unperturbed position of the tape.

15. The optical tape data storage system of claim 14 wherein the first light directing means comprises:

a reflecting means for redirecting the substantially collimated light beam including the indicia of differing optical characteristics of the array of binary data directed along the longitudinal axis from the optical rotator onto the moving optical tape; and an objective lens mounted between the reflecting means and the optical tape for converting the substantially collimated light beam from the optical rotator and redirected by the reflecting means into an image of the indicia of differing optical characteristics of the array of binary data on the optical tape.

16. The optical tape data storage system of claim 14 wherein the data writing section comprises:

an array of lasers, each laser generating a diverging modulated output light beam at a first wavelength representative of an indicia of optical characteristics of a separate binary bit of data at each instant of time;

means for converting the diverging light beams from the array of lasers into a collimated light beam; and a dichroic beam-splitter (DBS) for directing the substantially collimated light beam at the first frequency towards the optical rotator.

17. The optical tape data storage system of claim 16 wherein the array of lasers is oriented to produce an image thereof on the optical tape which is skewed by a predetermined angle relative to a direction of scan of the optical tape, and the lasers of the array are sequentially pulsed to produce rows of the indicia of differing optical characteristics of the array of binary data at the optical tape which are normal to the direction of scan of the optical tape.

18. The optical tape data storage system of claim 14 wherein the first head further comprises a data reading section comprising:

illumination means for generating a first light beam at a second predetermined wavelength and a first polarization direction to illuminate a predetermined portion of the optical tape; and a light sensing array comprising at least M light detectors for detecting an optical reflected image of optical characteristics of an array of binary data stored at the illuminated predetermined portion of the optical tape and converting such detected optical characteristics of the array of binary data into representative electrical signals, where an image on the light sensing array of the optical tape is wider than a swath of M parallel binary data tracks formed thereon.

19. The optical tape data storage system of claim 18 wherein the data reading section further comprises:

a polarization beam-splitter (PBS) for directing the first light beam from the illumination means at the second wavelength and the first polarization direction towards a dichroic beam-splitter (DBS) of the data writing section for redirection along the optical path, and for directing the second light beam which enters the PBS from a direction of the DBS at the second wavelength and the second polarization direction normal to the first polarization direction through the PBS to the light sensing array; and a quarter-wavelength plate, disposed in the optical path between the PBS and the optical tape, for rotating the first light beam from the illumination means at the second wavelength and the first polarization direction propagating towards the optical tape by 45 degrees to produce a third light beam, and for rotating a fourth light beam having the wavelength and polarization of the third light beam which is produced by a reflection of the optical tape illuminated by the third light beam by an additional 45 degrees to produce the second light beam which is directed towards the PBS.

20. The optical tape data storage system of claim 14 further comprising:

at least one second head means, each second head means comprising an array of M lasers, the second head being arranged for supplying a separate light beam including indicia of differing optical characteristics of an array of M separate binary data, said separate light beam propagating through the optical rotator along a separate path parallel to the optical path through the optical rotator of the light beam generated by the first head means; and at least one second optical means, each second optical means being associated with a corresponding second head means to effect an imaging of the light beam from the associated second head means onto a separate portion of the optical tape, each second optical means comprising a separate second light directing means rotating around an axis parallel to the optical path incident to said second light directing means for redirecting the light beam onto the separate portion of the optical tape using a second focusing control arrangement.

21. The optical tape data storage system of claim 20 further comprising a fold mirror comprising a plurality of mirrors folded at a predetermined angle relative to the first path from the optical rotator, each mirror forming a separate one of each of the first optical means and the at least one second optical means for effecting the dynamic imaging of the indicia of differing optical characteristics of the light beam from the associated first head means and each second head means onto the separate portion of the optical tape.

22. The system of claim 14 wherein the first light directing means comprises:

an imaging lens having a predetermined nominal depth of focus; and wherein said focusing control arrangement maintains the position of the optical tape within the predetermined nominal depth of focus of the imaging lens.

23. The system of claim 22 wherein the self-acting mechanism comprises an air bearing slider, said air bearing slider protruding from the drum and not substantially contacting the optical tape during a writing or reading operation while maintaining the optical tape suspended on a layer of gas over the slider at a focal area of the imaging lens.

24. A method for the optical recording or reading of data comprising the steps of:

(a) passing an optical tape, which is suitable for storage of binary data in the form of indicia of differing optical characteristics to those of the unwritten optical tape, over a cylindrical outer surface of a drum;

(b) generating in a data writing section a light beam from an array of M lasers at a first predetermined wavelength including indicia of differing optical characteristics of the array of M binary data, said light beam being directed along an optical path;

(c) rotating an optical rotator at a second speed around its optical axis for receiving the light beam from the data writing section; and (d) rotating optical light directing means around an axis parallel to the optical path incident to said light directing means for receiving the light beam propagating along the optical path from the rotating optical rotator, said light directing means redirecting and focusing the light beam supplied in step (b) onto a predetermined portion of the optical tape, and scanning the optical tape using a focusing control arrangement for writing a swath of binary data which is M databits wide, said focusing control arrangement including a self-acting mechanism for maintaining a position of said optical tape, said self-acting mechanism not substantially contacting said tape and protruding above an unperturbed position of the tape.

25. The method of claim 24 comprising the further steps of:

(e) generating in a data reading section an illumination light beam at a second predetermined wavelength and a first polarization direction which is directed along the optical path through the optical rotator and along the path through the rotating optical light directing means to illuminate the predetermined portion of the optical tape;

(f) detecting optical characteristic of a reflected image of an array of binary data stored at the illuminated predetermined portion of the optical tape with a light sensing array comprising at least M light detectors, where an image on the light sensing array of the optical tape is wider than the swath of M parallel binary data tracks formed thereon; and (g) converting the optical characteristic of the array of binary data detected in step (f) into representative electrical signals.

26. The method of claim 25 comprising the further steps of:

(h) converting the light beam generated in step (b) into a substantially collimated light beam; and (i) directing the substantially collimated light beam at the first frequency converted in step (h), and the illumination light beam at the second predetermined wavelength through a dichroic beam-splitter (DBS) for propagation along the optical path towards the optical rotator.

27. The method of claim 26 comprising the further steps of:

(j) directing the illumination light beam at the second wavelength and the first polarization direction in step (i) through a polarization beam-splitter (PBS) prior to directing the illumination light beam through the DBS;

(k) directing the second light beam at the second wavelength and the second polarization direction normal to the first polarization direction through each of the DBS and the PBS to the light sensing array when performing step (f); and (l) directing each of the illumination light beam and the second light beam through a quarter-wavelength plate, disposed in the optical path between the PBS and the optical tape, for rotating the illumination light beam at the second wavelength and the first polarization direction propagating towards the optical tape by 45 degrees to produce a third light beam, and for rotating a fourth light beam having the wavelength and polarization of the third light beam which is produced by a reflection at the optical tape illuminated by the third light beam by an additional 45 degrees to produce the second light beam which is directed towards the PBS.

28. The method of claim 24 wherein in performing step (b) performing the substeps of:

(b1) orienting the array of lasers to produce an image thereof on the optical tape which is skewed by a predetermined angle relative to a direction of scan of the optical tape; and (b2) sequentially pulsing the lasers of the array to produce rows of the indicia of differing optical characteristics of the array of binary data at the optical tape which are normal to the direction of scan of the optical tape.

29. The method of claim 24 wherein in performing step (d), performing the substeps of:

(d1) redirecting the light beam through an imaging lens having a predetermined nominal depth of focus; and (d2) maintaining the position of the optical tape within the predetermined nominal depth of focus of the imaging lens using said focusing control arrangement.

30. The method of claim 24 wherein concurrent with performing steps (b), (c), and (d), performing the steps of:
  (e) generating a second light beam at a first predetermined wavelength from a second array of M lasers including a second array of M binary data light beams for direction through the optical rotator along a separate path parallel to the path through the optical rotator of the first light beam;
  (f) effecting an imaging of the indicia of differing optical characteristics of the second array of M binary data in the second light beam from the associated second array of M lasers onto a separate portion of the optical tape using a second optical means comprising a second light directing means rotating around an axis parallel to the optical path incident to said second light directing means for redirecting the light beam onto the separate portion of the optical tape using a second focusing control arrangement.

31. A system for the optical recording or playback of data, the system comprising:
  means to pass tape material, suitable for data storage in the form of indicia of differing optical characteristics to those of the tape material, over an outer surface of a drum;
  means to supply light for direction onto the tape material to effect scanning of the tape material; and
  means to effect focusing of the light, output from the light supply means, onto the tape material, the focusing means being positioned in the light path intermediate the light supply means and the tape, said focusing means including a self-acting mechanism for maintaining a position of said optical tape, said self-acting mechanism not substantially contacting said tape and protruding above an unperturbed position of the tape.

32. A system for the optical recording or playback of data comprising:
  means for passing an optical tape, which is suitable for storage of binary data in the form of indicia of differing optical characteristics to those of the optical tape, over a cylindrical outer surface of a drum;
  a data writing section comprising an array of M lasers for generating a first light beam including indicia of differing optical characteristics of an array of M separate binary data, said light beam being directed along an optical path for writing a swath of M binary data bits on said optical tape;
  a data reading section for reading a data track of said M data bits formed on said optical tape utilizing a tracking arrangement, said data reading section comprising illumination means for generating a second light beam to illuminate a predetermined portion of the optical tape and a light sensing array comprising at least M light detectors for detecting the optical characteristics of a reflected image of said M data bits stored at the illuminated predetermined portion of the optical tape and converting such detected optical characteristics of the data into representative electrical signals;
  first optical means to effect an imaging of said first or second light beam onto said predetermined portion of the optical tape, the first optical means comprising:
    an optical rotator for receiving said first or second light beam propagating along the optical path, the optical rotator being rotated around its optical axis; and
    light directing means rotating around an axis parallel to the optical path incident to said light directing means for receiving the light beam propagating along the incident optical path from the optical rotator, said light directing means redirecting and focusing the light beam onto the predetermined portion of the optical tape using a focusing control arrangement, said focusing arrangement including a self-acting mechanism for maintaining a position of said optical tape, said self-acting mechanism not substantially contacting said tape and protruding above said outer surface of said drum.

33. The system of claim 32, wherein said passive tracking arrangement consists of said light sensing array having an optical receiving area that is wider than the width of said data track being read and said illuminated predetermined portion of said optical tape having a width that is wider than the width of said data track being read.

34. An optical tape data storage system comprising:
  a drum comprising a cylindrical outer surface defining a first opening around at least a portion thereof disposed normal to a longitudinal axis of the drum over which an optical tape is moved, the drum further defining a second opening parallel to a longitudinal axis of the drum which intersects the first opening;
  an optical rotator which is rotated in the second opening of the drum around an axis parallel to the longitudinal axis of the drum;
  a cylindrical headwheel disposed in the first opening of the drum for rotation around the longitudinal axis of the drum;
  first light directing means mounted on an end of the cylindrical headwheel for redirecting a substantially collimated light beam from said optical rotator onto a predetermined section of the optical tape; and
  a first head comprising:
    a data writing section comprising an array of M lasers for generating said collimated light beam including indicia of differing optical characteristics of an array of M separate binary data, said collimated light beam being directed along an optical path through said optical rotator, said collimated light beam being redirected by said light directing means and focused onto said predetermined portion of said optical tape for writing a swath of M data bits using a focusing control arrangement, said focusing arrangement including a self-acting mechanism for maintaining a position of said optical tape, said self-acting mechanism not substantially contacting said tape and protruding above said outer surface of said drum; and
    a data reading section for reading a data track of said M data bits formed on said optical tape utilizing a tracking arrangement, said data reading section comprising illumination means for generating a second light beam to illuminate a predetermined portion of the optical tape and a light sensing array comprising at least M light detectors for detecting the optical characteristics of a reflected image of said M data bits stored at the illuminated predetermined portion of the optical tape and converting such detected optical characteristics of the data into representative electrical signals.

35. The system of claim 34, wherein said passive tracking arrangement consists of said light sensing array having an optical receiving area that is wider than the width of said data track being read and said illuminated predetermined portion of said optical tape having a width that is wider than the width of said data track being read.

36. A method for the optical reading of data recorded on an optical tape data storage system comprising the steps of:

(a) passing an optical tape, which is suitable for storage of binary data in the form of indicia of differing optical characteristics to those of the optical tape, over a cylindrical outer surface of a drum;

(b) generating in a data writing section a first light beam from an array of M lasers including indicia of differing optical characteristics of the array of M binary data, said light beam being directed along an optical path for writing a swath of binary data on said optical tape which is M databits wide;

(c) reading with a data reading section a data track of said M data bits formed on said optical tape utilizing a tracking arrangement, said data reading section comprising illumination means for generating a second light beam to illuminate a predetermined portion of the optical tape and a light sensing array comprising at least M light detectors for detecting the optical characteristics of a reflected image of said M data bits stored at the illuminated predetermined portion of the optical tape and converting such detected optical characteristics of the data into representative electrical signals;

(d) rotating an optical rotator around its optical axis for receiving said first or second light beam from the data writing section or data reading section; and (e) rotating optical light directing means around an axis parallel to the optical path incident to said light directing means for receiving said first or second light beam propagating along the optical path from the rotating optical rotator, said light directing means redirecting and focusing said first or second light beam onto a predetermined portion of the optical tape using a focusing control arrangement, said focusing arrangement including a self-acting mechanism for maintaining a position of said optical tape, said self-acting mechanism not substantially contacting said tape and protruding above an unperturbed position of the tape.

37. The method of claim 36, wherein said passive tracking arrangement consists of said light sensing array having an optical receiving area that is wider than the width of said data track being read and said illuminated predetermined portion of said optical tape having a width that is wider than the width of said data track being read.

38. A system for the optical recording or playback of data, the system comprising:

means to pass tape material, suitable for data storage in the form of indicia of differing optical characteristics to those of the tape material, over an outer surface of a drum;

means to supply light for direction onto a portion of the tape material passing over the drum to effect scanning of the portion of the tape material;

means to effect focusing of the light, output from the light supply means, onto the portion of the tape material, the focusing means being positioned in the light path intermediate the light supply means and the drum, said focusing means including a self-acting mechanism for maintaining a position of said optical tape, said self-acting mechanism not substantially contacting said tape and protruding above an unperturbed position of the tape; and a tracking arrangement for locating and reading tracks of data bits from said optical tape.

39. An optical data recording or playback system comprising:

a drum comprising a cylindrical outer surface defining a first opening around at least a portion thereof disposed normal to a longitudinal axis of the drum over which an optical tape is moved, the drum further defining a second opening parallel to a longitudinal axis of the drum which intersects the first opening;

an optical rotator which is rotated in the second opening of the drum around an axis parallel to the longitudinal axis of the drum; and, an optical head comprising a first head, said first head including a data writing section comprising a first optical light source for generating a first light beam at a first predetermined wavelength including indicia of differing optical characteristics of an array of M separate binary data, said first light beam being directed along a first optical path, said optical rotator receiving said first light beam propagating on said first optical path, and, said drum further comprising a focusing control arrangement including a self-acting mechanism, said self-acting mechanism protruding above said outer surface of said drum and not substantially contacting said tape such that said first light beam on said first optical path is focused onto a predetermined portion of the optical tape.

40. The system of claim 39, wherein the optical head further comprises a second optical head, said second head including a data reading section comprising a second optical light source for generating a second light beam at a second predetermined wavelength including indicia of differing optical characteristics of an array of M separate binary data, said second light beam being directed on a second optical path, to the optical rotator and focused onto another predetermined portion of the optical tape.

41. The system of claim 39, wherein said self-acting mechanism supports said optical tape above said outer surface of said drum using a film of air.

* * * * *